(12) United States Patent
Nakamura et al.

(10) Patent No.: US 7,193,972 B1
(45) Date of Patent: Mar. 20, 2007

(54) DATA TRANSMISSION METHOD AND DATA TRANSMITTER

(75) Inventors: Sachiko Nakamura, Tokyo (JP); Yoshihiro Obase, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1120 days.

(21) Appl. No.: 10/129,819

(22) PCT Filed: Oct. 6, 2000

(86) PCT No.: PCT/JP00/07001

§ 371 (c)(1),
(2), (4) Date: May 9, 2002

(87) PCT Pub. No.: WO02/32079

PCT Pub. Date: Apr. 18, 2002

(51) Int. Cl.
*H04J 1/16* (2006.01)
*H04J 3/14* (2006.01)
*H04L 1/00* (2006.01)
*H04L 12/26* (2006.01)

(52) U.S. Cl. .............. 370/252; 370/229; 370/230; 370/235

(58) Field of Classification Search .............. None
See application file for complete search history.

(56) References Cited

U.S. PATENT DOCUMENTS

| | | | | |
|---|---|---|---|---|
| 5,956,321 | A * | 9/1999 | Yao et al. | 370/230 |
| 6,377,541 | B1 * | 4/2002 | Boetzel | 370/216 |
| 6,507,592 | B1 * | 1/2003 | Hurvig et al. | 370/503 |
| 6,597,660 | B1 * | 7/2003 | Rueda et al. | 370/230.1 |
| 6,788,686 | B1 * | 9/2004 | Khotimsky et al. | 370/394 |
| 6,876,629 | B2 * | 4/2005 | Beshai et al. | 370/232 |
| 2002/0036984 | A1 * | 3/2002 | Chiussi et al. | 370/232 |
| 2002/0163887 | A1 * | 11/2002 | Suni | 370/232 |
| 2004/0170198 | A1 * | 9/2004 | Meggers et al. | 370/514 |

FOREIGN PATENT DOCUMENTS

| | | |
|---|---|---|
| JP | 11-041286 | 2/1999 |
| JP | 11-122300 | 4/1999 |
| JP | 11-239155 | 8/1999 |
| JP | 2000-101637 | 4/2000 |

* cited by examiner

*Primary Examiner*—Chirag G. Shah
(74) *Attorney, Agent, or Firm*—Oblon, Spivak, McClelland, Maier & Neustadt, P.C.

(57) ABSTRACT

An arrival time of each piece of data is calculated from an occurrence time of the piece of data and a transmission unit time period of the piece of data, and pieces of data are transmitted in the order of increasing a calculated value.

6 Claims, 7 Drawing Sheets

PRIOR ART FIG.2
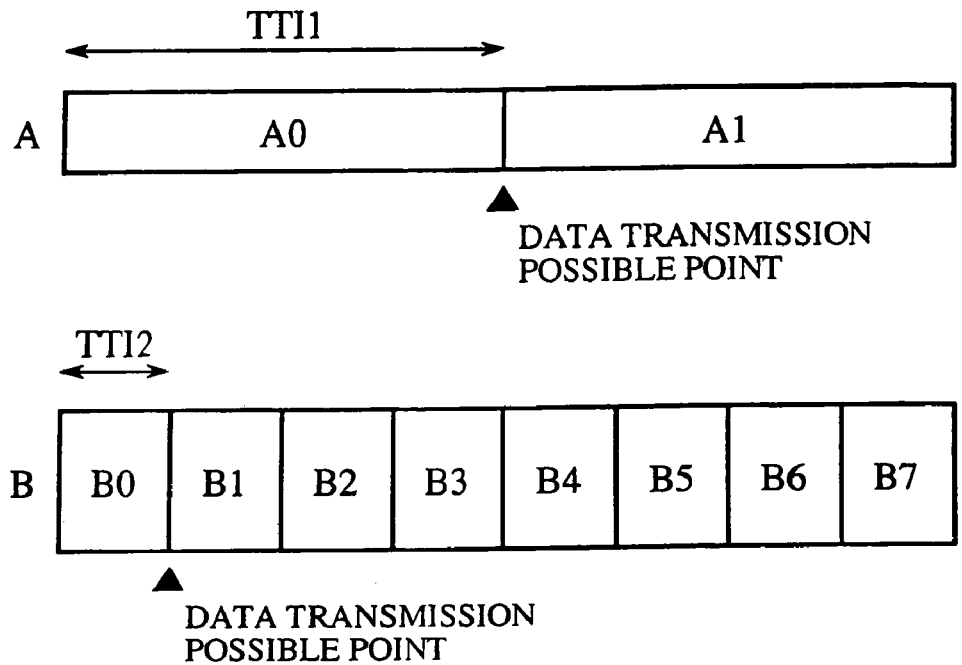
FIG.4
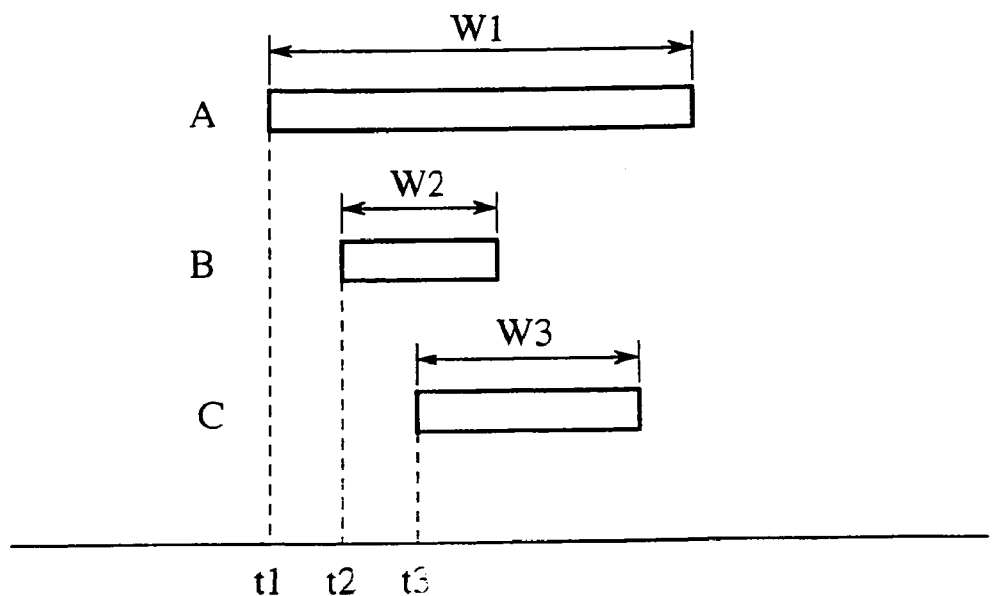

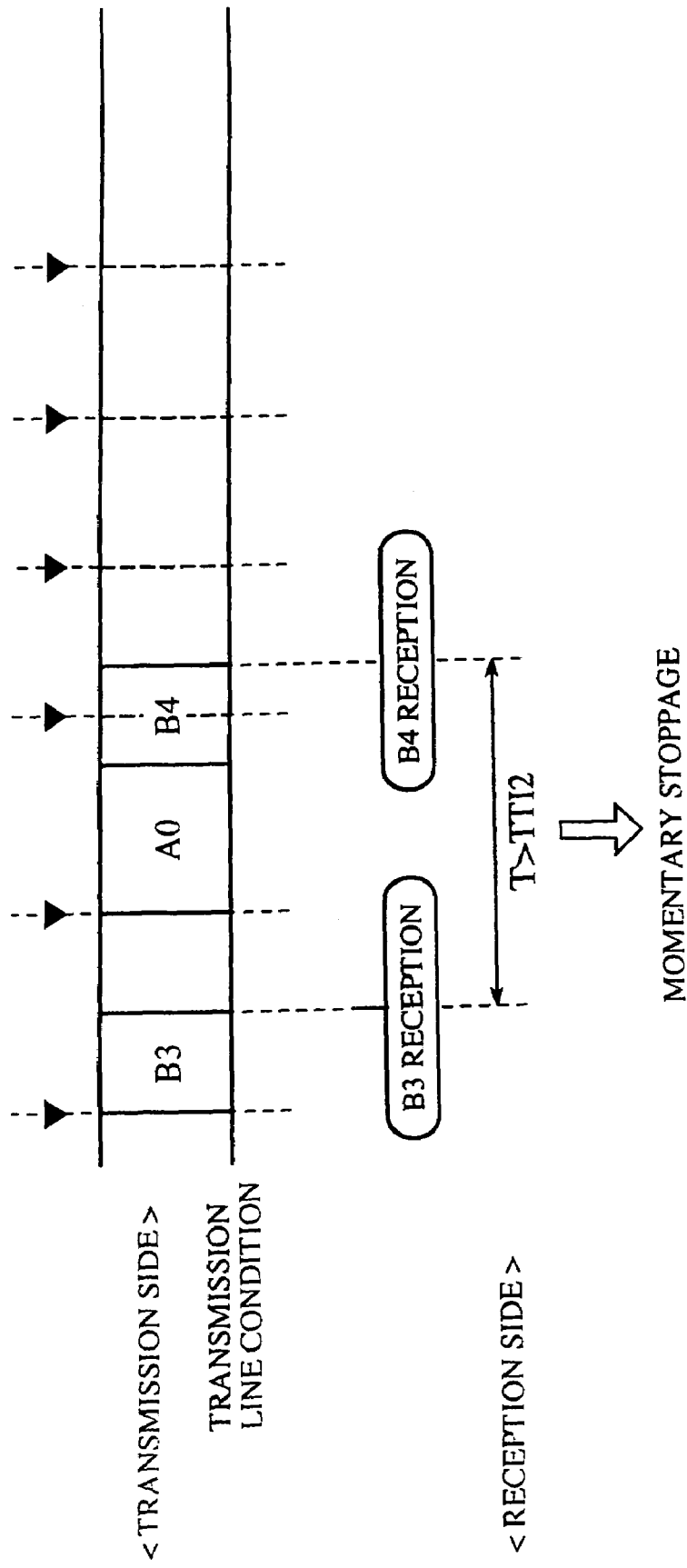

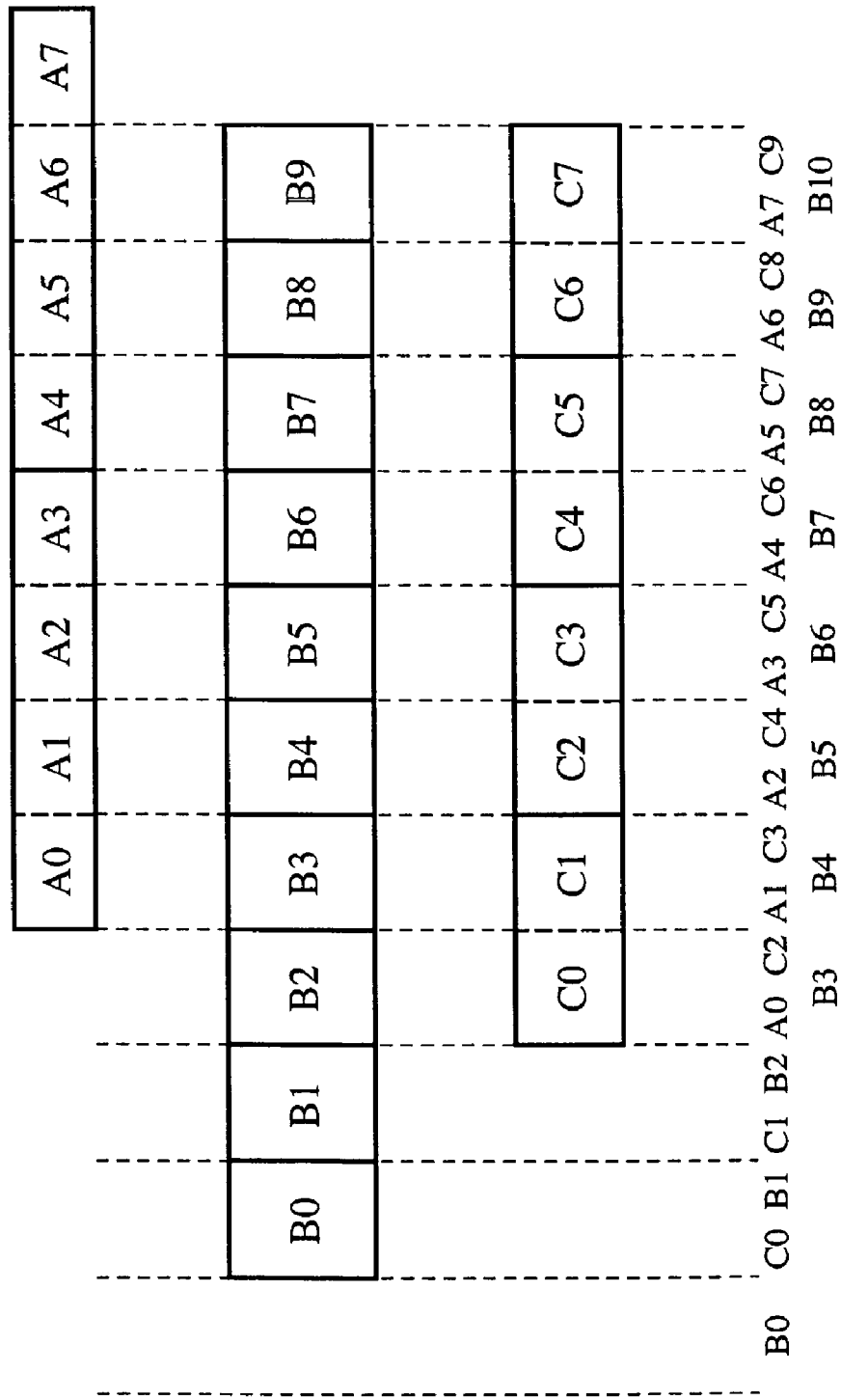

DATA TRANSMISSION METHOD AND DATA TRANSMITTER

TECHNICAL FIELD

The present invention relates to a data transmission method and a data transmission device in which pieces of data having transmission unit time periods and data sizes different from each other are transmitted from various types of media to other devices through a single transmission line.

BACKGROUND ART

In a conventional type of data transmission from various types of media to other devices through a single transmission line, because transmission unit time periods of pieces of transmission data are the same as each other and data sizes of the pieces of transmission data are the same as each other, there is no problem. However, in a WCDMA data transmission, it is required to transmit pieces of data having transmission unit time periods and data sizes different from each other from various types of media.

FIG. 1 shows a data transmission between a wire transmission line interface unit 2 of a base band signal processing unit 1 of a radio base station device and a wire transmission line interface unit 4 of a radio network control device 3. Pieces of data are transmitted from the base band signal processing unit 1 to the wire transmission line interface unit 4 of the radio network control device 3 through the wire transmission line interface unit 2 and a transmission line 5 in the order in which the pieces of data are received in the base band signal processing unit 1.

FIG. 2 is a view explaining the conventional data transmission order by using both data A and data B. When a piece of data A having a long minimum processing time period TTI1 is transmitted, the transmission line 5 is occupied by the data A. Therefore, another piece of data B cannot be transmitted during the transmission of the data A. Accordingly, in cases where another piece of data B having a short minimum processing time period TTI2 is received, a momentary stoppage of the data transmission occurs, or the delay in the data transmission occurs in the device.

FIG. 3 shows a relationship between a transmission side and a reception side in the conventional data transmission. In cases where data A0 of the data A is transmitted after the transmission of data B3 of the data B, it is impossible to transmit data B4 of the data B until the transmission of the data A0 is completed. Therefore, as shown in FIG. 3, a momentary stoppage of the data transmission occurs between the data B3 and the data B4 on the reception side.

As is described above, pieces of data are transmitted in a conventional data transmission method and a conventional data transmission device in the order in which the pieces of data are made possible to be transmitted. Therefore, when data having a long processing unit time period is transmitted, the transmission line is occupied by the data for a long time period during the transmission of the data, and another piece of data cannot be transmitted during the transmission of the data. Also, even though the data having the long processing unit time period is divided into pieces of divided data and is transmitted, in cases where the pieces of divided data are successively transmitted, a transmission and occupation time period of the data is lengthened. Therefore, a momentary stoppage of the data transmission occurs, or the successive transmission of the pieces of divided data adversely influences on data having a short processing unit time period such as speech data in which a real time reproduction is seriously considered. Accordingly, a problem has arisen that a data arrival time fluctuates.

The present invention is provided to solve the above-described problem, and the object of the present invention is to provide a data transmission method and a data transmission device in which a data transmission is efficiently performed through a transmission line and the fluctuation of a data arrival time is minimized.

DISCLOSURE OF THE INVENTION

In a data transmission method corresponding to the present invention, an arrival time of each piece of data is calculated from an occurrence time of the piece of data and a transmission unit time period of the piece of data, and pieces of data are transmitted in the order of increasing a calculated value.

Therefore, the transmission order can be controlled so as to start the data transmission at an optimum timing.

In a data transmission method corresponding to the present invention, each piece of data is divided into pieces of divided data at intervals of a transmission unit time period which is minimum among transmission unit time periods of all pieces of data to be transmitted from various types of media, the data transmission unit time period of each piece of data is added to a data occurrence time of each piece of divided data of the piece of data, and the pieces of divided data are transmitted in the order of increasing an added value.

Therefore, a divided size of each piece of divided data can be appropriately set, the data transmission is not stopped, a transmission line can be efficiently used, the delay in the data transmission from various types of media is reduced, and the fluctuation of a data arrival time can be minimized for each of the various types of media.

In a data transmission method corresponding to the present invention, the pieces of divided data corresponding to the same added value as each other are transmitted in the order of increasing a data size.

Therefore, the data transmission is not stopped, a transmission line can be efficiently used, the delay in the data transmission from various types of media is reduced, and the fluctuation of a data arrival time can be minimized for each of the various types of media.

In a data transmission method corresponding to the present invention, the pieces of divided data corresponding to the same added value as each other are transmitted in the order of the passage of a data occurrence time.

Therefore, the data transmission is not stopped, a transmission line can be efficiently used, the delay in the data transmission from various types of media is reduced, and the fluctuation of a data arrival time can be minimized for each of the various types of media.

In a data transmission method corresponding to the present invention, the pieces of divided data corresponding to the same added value as each other are transmitted in the order of increasing the data transmission unit time period.

Therefore, the data transmission is not stopped, a transmission line can be efficiently used, the delay in the data transmission from various types of media is reduced, and the fluctuation of a data arrival time can be minimized for each of the various types of media.

A data transmission device corresponding to the present invention comprises a function of calculating an arrival time of each piece of data from an occurrence time of the piece of data and a transmission unit time period of the piece of data, and a transmission function of transmitting pieces of data in the order of increasing a calculated value.

Therefore, the transmission order can be controlled so as to start the data transmission at an optimum timing.

A data transmission device comprises a division function of dividing each piece of data into pieces of divided data at intervals of a minimum transmission unit time period among transmission unit time periods of various types of media, an addition function of adding the data transmission unit time period of each of the various types of media to a data occurrence time of each piece of divided data of the piece of corresponding data, and a transmission function of transmitting the pieces of divided data in the order of increasing an added value.

Therefore, a divided size of each piece of divided data can be appropriately set, the data transmission is not stopped, a transmission line can be efficiently used, the delay in the data transmission from various types of media is reduced, and the fluctuation of a data arrival time can be minimized for each of the various types of media.

BRIEF DESCRIPTION OF THE DRAWINGS

FIG. 2 is a view explaining the conventional data transmission order.

FIG. 3 shows a relationship between a transmission side and a reception side in the conventional data transmission.

FIG. 4 is an explanatory view of a principle of the present invention.

FIG. 9 shows a reception condition of pieces of divided data which are transmitted in the determined data transmission order.

BEST MODE FOR CARRYING OUT THE INVENTION

Hereinafter, the best mode for carrying out the present invention will now be described with reference to the accompanying drawings to explain the present invention in more detail.

Embodiment 1

FIG. 4 is an explanatory view of a principle of the present invention. Data A, data B and data C are transmitted through a single transmission line. The data A occurs at a time t1 and has a data size W1. The data B occurs at a time t2 and has a data size W2. The data C occurs at a time t3 and has a data size W3.

Each of the pieces of data A, B and C is divided at intervals of a transmission unit time period which is minimum among transmission unit time periods of the pieces of data A, B and C transmitted through a single transmission line, and the pieces of data A, B and C are transmitted while considering an occurrence time of each piece of data. Therefore, the data transmission line can be efficiently used, and the fluctuation of a data arrival time can be minimized.

Hereinafter, a data transmission method and a data transmission device will be described in detail.

Figure 5:
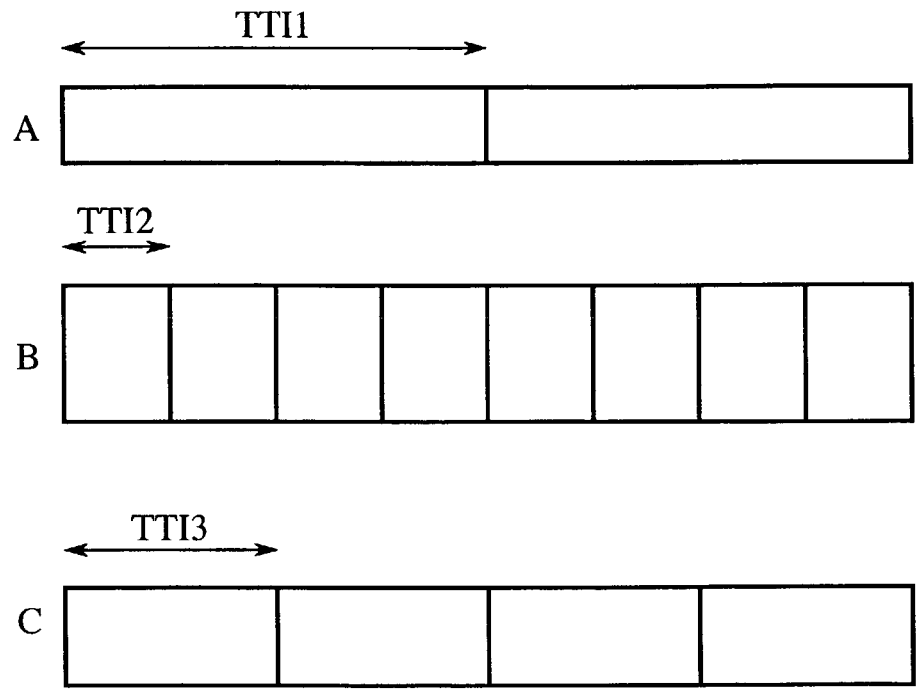
FIG. 5 shows a relationship among pieces of data sent from three media and transmitted through a single transmission line.

FIG. 5 shows the pieces of data A, B and C sent from three media and transmitted through a single transmission line. The pieces of data A, B and C occur at the same time as each other. However, the data A has a minimum processing time period TTI1, the data B has a minimum processing time period TTI2, and the data C has a minimum processing time period TTI3. Here, each of the pieces of data A, B and C is divided at intervals of the minimum processing time period (that is, the processing time period TTI2 of the data B) which is minimum among the processing time periods TTI1, TTI2 and TTI3 of the pieces of data A, B and C, and pieces of divided data of the pieces of data A, B and C are shown in FIG. 6.

Thereafter, the pieces of divided data are rearranged in transmission order. For example, a transmission unit time period of each of the types of media (or a minimum processing time period of each piece of divided data) is added to a data occurrence time of each piece of divided data of the piece of corresponding data, and the pieces of divided data are transmitted in the order of increasing the added value. In cases where the added values corresponding to pieces of divided data are the same as each other, the pieces of divided data are transmitted in the order of increasing the data size, the order of the passage of the data occurrence time or the order of increasing the transmission unit time period.

Figure 7:
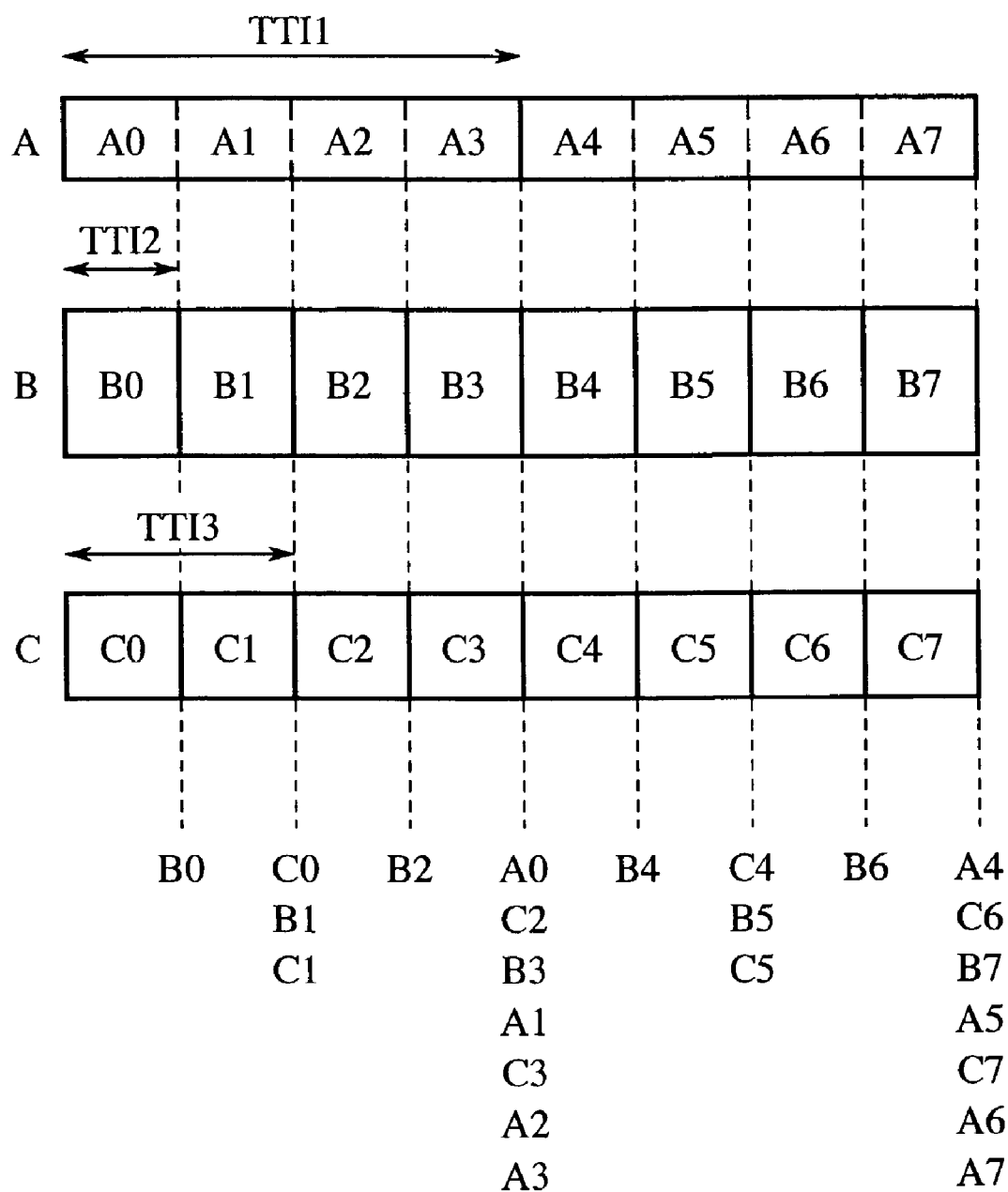
FIG. 7 shows pieces of divided data in the determined data transmission order.
Figure 8:
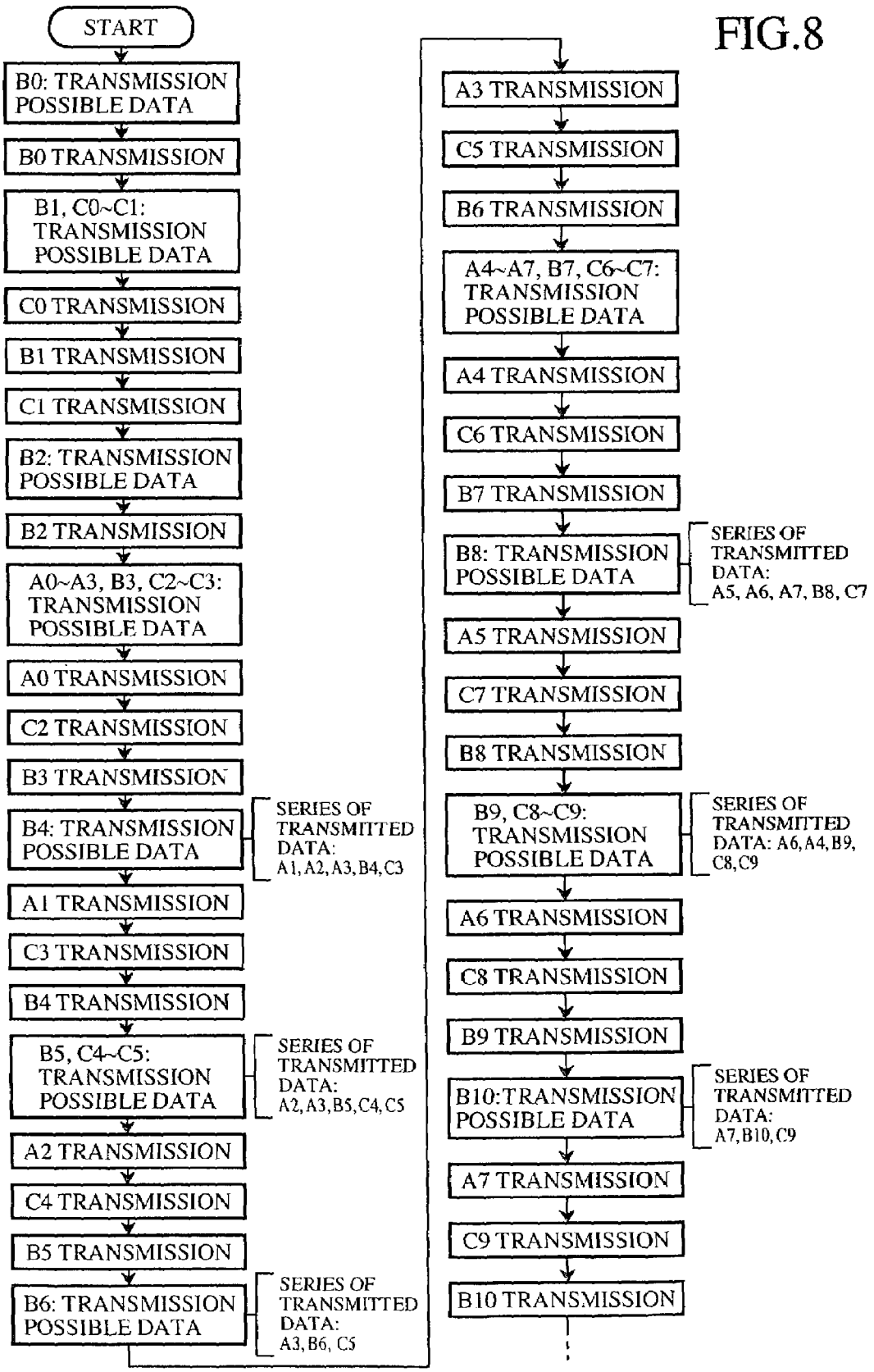
FIG. 8 is a flow chart showing a data transmission based on the determined data transmission order.

FIG. 7 shows the pieces of divided data in the data transmission order determined according to the above-described method. As shown in FIG. 8, the pieces of divided data are set to a transmission possible state in the order of B0-(C0-B1-C1)-B2-(A0-C2-B3-A1-C3-A2-A3)-B4-(C4-B5-C5)-B6-(A4-C6-B7-A5-C7-A6-A7).

Figure 6:
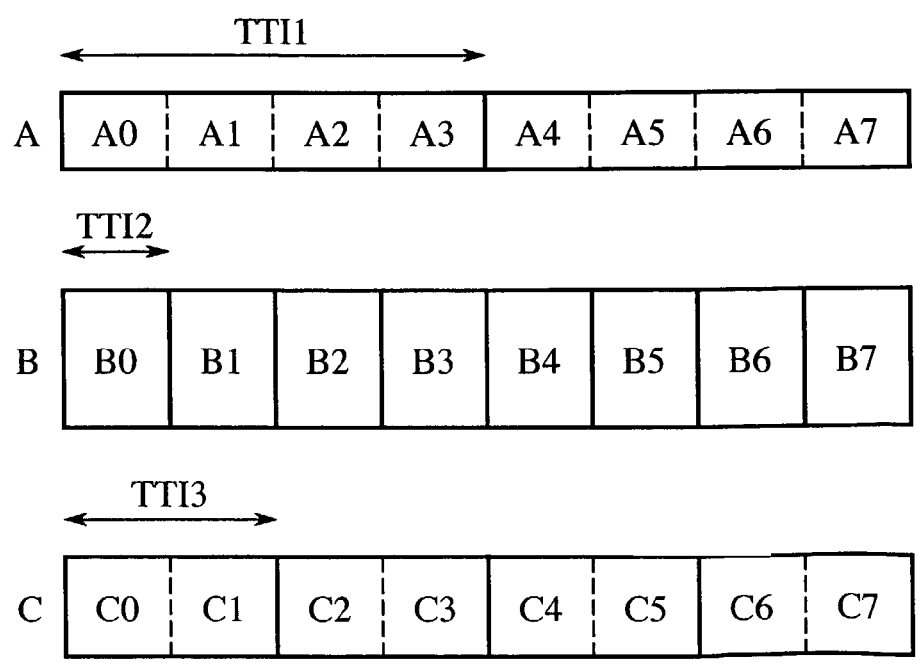
FIG. 6 is a view showing divided conditions of data.

A relationship among the minimum processing time periods TTI (TTI1, TTI2, TTI3) shown in FIG. 6 and FIG. 7 is expressed as follows.

$TTI1 = TTI2 \times 4 = TTI3 \times 2$

Also, a relationship among the data sizes (A0 ... A7, B0 ... B7, C0 ... C7) shown in FIG. 6 and FIG. 7 is expressed as follows.

$A0 = A1 = A2$ $B0 = B1 = B2$ $C0 = C1 = C2$ $B0 = A0 \times 3$ $C0 = A0 \times 2$ An assumed capacity of the transmission line is set to a transmission-possible size ($= A0 \times 6$) at the minimum processing time period TTI2.

Assuming that the data size A0 is equal to 2 and the transmission possible size at the minimum processing time period TTI2 is equal to 12, pieces of divided data possible to be transmitted are rearranged in the optimum transmission order according to transmission line occupying information added and additional information such as information occurrence times, transmission unit time periods and data sizes, and the pieces of divided data are rearranged in the optimum transmission order of B0-(C0-B1-C1)-B2-(A0-C2-B3-A1-C3-B4)-(A2-C4-B5)-(A3-C5-B6)-(A4-C6-B7-A5-C7-B8).

FIG. 9 shows a reception condition of the pieces of divided data which are transmitted in the transmission order determined according to the above-described method. The pieces of divided data are received in the transmission order of B0-(C0-B1)-(C1-B2)-(A0-C2-B3)-(A1-C3-B4)-(A2-C4-B5)-(A3-C5-B6)-(A4-C6-B7)-(A5-C7-B8)-(A6-C8-B9)-(A7-C9-B10)).

Figure 1:
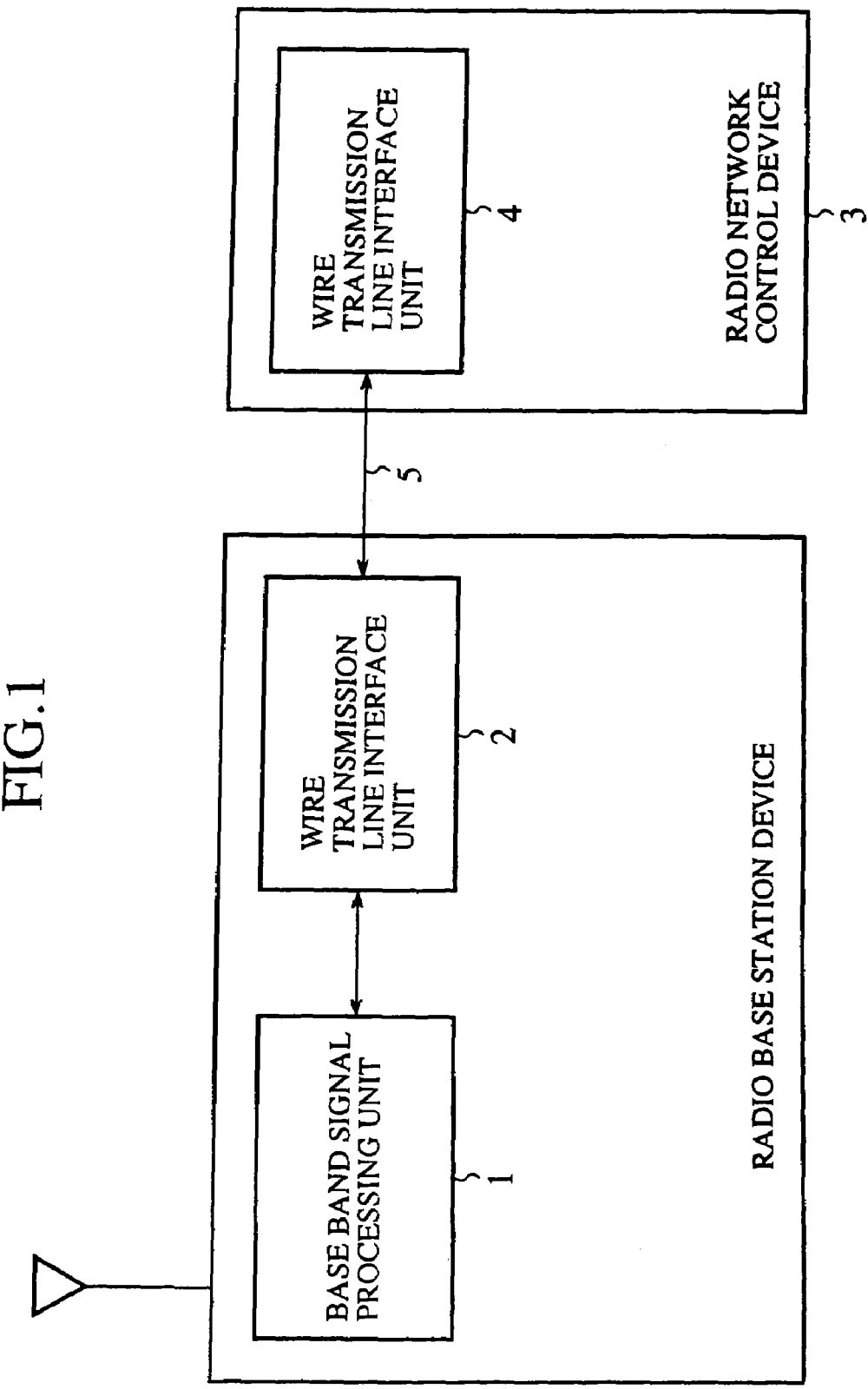
FIG. 1 shows a schematic view of a data transmission device.

Also, a data transmission device having a function of calculating a data arrival time from both a data occurrence time and a data transmission unit time period and a transmission function of transmitting pieces of divided data through a transmission line in the order of increasing a calculated value, or a data transmission device having a division function of dividing each piece of transmission data to pieces of divided data at intervals of a minimum transmission unit time period which is minimum among transmission unit time periods of various types of media, an addition function of adding a transmission unit time period of each of various types of media to a data occurrence time of each piece of corresponding divided data and a transmission function of transmitting the pieces of divided data in the order of increasing an added value can be embodied by the base band signal processing unit 1 or the radio network control device 3 shown in FIG. 1.

As is described above, in the first embodiment of the present invention, the data arrival time of each piece of divided data is calculated, and the pieces of divided data are transmitted in the order of increasing the data arrival time. Therefore, a momentary stoppage of the data transmission can be prevented, the transmission line can be efficiently used, the delay in the data transmission from various types of media can be reduced, and the fluctuation of the data arrival time can be minimized for each of various types of media.

Also, each piece of data is divided into pieces of divided data at intervals of a transmission unit time period which is minimum among transmission unit time periods of various types of media, each data transmission unit time period is added to a data occurrence time of each piece of corresponding divided data, and the pieces of divided data are transmitted in the order of increasing the added value. Therefore, a momentary stoppage of the data transmission can be prevented, the transmission line can be efficiently used, the delay in the data transmission from various types of media can be reduced, and the fluctuation of the data arrival time can be minimized for each of various types of media.

INDUSTRIAL APPLICABILITY

As is described above, the data transmission method and the data transmission device according to the present invention are appropriate for the method and device in which the fluctuation of a data arrival time in the data transmission is minimized and a transmission line is efficiently used.

What is claimed is:

1. A data transmission method, in which pieces of data having transmission unit time periods and data sizes different from each other are transmitted from various types of media to other devices through a transmission line, comprising the steps of:
    calculating an arrival time of each piece of data from an occurrence time of the piece of data and the transmission unit time period of the piece of data;
    dividing each piece of data into pieces of divided data at intervals of the transmission unit time period which is minimum among the transmission unit time periods of the various types of media;
    adding the data transmission unit time period of each of the various types of media to a data occurrence time of each piece of divided data of the piece of corresponding data; and
    transmitting the pieces of data in increasing order according to the calculated arrival time corresponding to each piece of data and according to the added data transmission unit time period corresponding to each piece of divided data.

2. A data transmission method, in which pieces of data having transmission unit time periods and data sizes different from each other are transmitted from various types of media to other devices through a transmission line, comprising the steps of:
    dividing each piece of data into pieces of divided data at intervals of the transmission unit time period which is minimum among the transmission unit time periods of all the pieces of data to be transmitted from the various types of media;
    adding the data transmission unit time period of each piece of data to a data occurrence time of each piece of divided data of the piece of data; and
    transmitting the pieces of divided data in increasing order according to the added data transmission unit time period corresponding to each piece of divided data.

3. A data transmission method according to claim 2, wherein the step of transmitting the pieces of divided data includes the step of transmitting the pieces of divided data corresponding to the same added data transmission unit time period as each other in the order of increasing a data size.

4. A data transmission method according to claim 2, wherein the step of transmitting the pieces of divided data includes the step of transmitting the pieces of divided data corresponding to the same added data transmission unit time period as each other in the order of the passage of a data occurrence time.

5. A data transmission method according to claim 2, wherein the step of transmitting the pieces of divided data includes the step of transmitting the pieces of divided data corresponding to the same added data transmission unit time period as each other in the order of increasing the transmission unit time period.

6. A data transmission device, in which pieces of data having transmission unit time periods and data sizes different from each other are transmitted from various types of media to other devices through a transmission line, comprising:
    a function of calculating an arrival time of each piece of data from an occurrence time of the piece of data and the transmission unit time period of the piece of data;
    a division function of dividing each piece of data into pieces of divided data at intervals of the transmission unit time period which is minimum among the transmission unit time periods of the various types of media;
    an addition function of adding the data transmission unit time period of each of the various types of media to a data occurrence time of each piece of divided data of the piece of corresponding data; and
    a transmission function of transmitting the pieces of data in increasing order according to the calculated arrival time corresponding to each piece of data and according to the added data transmission unit time period corresponding to each piece of divided data.

* * * * *